United States Patent [19]

Oishi et al.

[11] Patent Number: 4,836,652
[45] Date of Patent: Jun. 6, 1989

[54] LIQUID CRYSTAL SHUTTER ARRAY HAVING MICROLENSES CORRESPONDING TO THE PIXEL ELECTRODES

[75] Inventors: Hisao Oishi; Kazuhiko Yanagihara; Tadashi Miyakawa, all of Kanagawa; Takeshi Nakamura, Osaka; Kazuhiko Akimoto, Osaka; Mitsuaki Shioji, Osaka, all of Japan

[73] Assignees: Fuji Photo Film Co., Ltd.; Sharp Kabushiki Kaisha, both of Japan

[21] Appl. No.: 120,450

[22] Filed: Nov. 13, 1987

[30] Foreign Application Priority Data

Nov. 13, 1986 [JP] Japan ................... 61-270534

[51] Int. Cl.$^4$ .................. G02F 1/13; G02B 17/02
[52] U.S. Cl. .................. 350/334; 350/339 R; 350/342; 350/114
[58] Field of Search .............. 350/334, 339 F, 342, 350/114, 339 R

[56] References Cited

U.S. PATENT DOCUMENTS 4,263,594  4/1981  Masucci .................. 350/345
4,591,240  5/1986  Masaki et al. ............ 350/339 F
4,686,519  8/1987  Yoshida et al. ........... 350/345

FOREIGN PATENT DOCUMENTS 0241024  11/1985  Japan .................. 350/334
0262131  12/1985  Japan .................. 350/337

OTHER PUBLICATIONS

M. Brandon, "Display Device", IBM Technical Disclosure Bulletin vol. 19, No. 2, Jul. 1976.

Primary Examiner—Stanley D. Miller
Assistant Examiner—Huy K. Mai
Attorney, Agent, or Firm—Sughrue, Mion, Zinn, Macpeak & Seas

[57] ABSTRACT

A liquid crystal shutter array requiring no separate focusing lens system. Microlenses for focusing the light incident upon a matrix of pixel electrodes are formed in a transparent substrate of the shutter assembly. A refractive index of light of each of the microlenses is set in a manner such that the incident angle $\theta$ of the light incident on the liquid crystal of the shutter through the microlenses satisfies;

$$\theta \leq \tan^{-1}\left(\frac{P-a}{d}\right)$$

where P, a, and d respectively represent the size of each of the photomasks, the length of a portion where each of the photomasks and corresponding ones of the pixel electrodes overlap, and the thickness of the transparent substrate on the light output side.

7 Claims, 3 Drawing Sheets

LIQUID CRYSTAL SHUTTER ARRAY HAVING MICROLENSES CORRESPONDING TO THE PIXEL ELECTRODES

BACKGROUND OF THE INVENTION

The present invention relates to a liquid crystal shutter array utilized, for example, as a liquid crystal optical shutter. More particularly, the invention relates to a liquid crystal shutter array in which the magnitude and/or application time, or the frequency of a voltage applied to a liquid crystal is controlled to thereby modulate the quantity of transmitted or reflected light.

Conventionally, when a picture is recorded on a photosensitive material using a liquid crystal shutter array, a process as shown in FIG. 1 has been generally used. That is, a parallel light beam 1 is made incident on a liquid crystal shutter array 10 controlled in accordance with a picture signal so that the parallel light beam 1 is on/off-controlled or shutter-controlled by the liquid crystal shutter array 10. The beam 1 is focused on a photosensitive material 30 through a Selfoc lens array 20 so as to record a picture on the photosensitive material 30. ("Selfoc" is a trade name of Nippon Sheet Glass Co., Ltd., and a Selfoc lens is a lens of the refractive index distribution type). In this liquid crystal shutter array 10, a pair of orientation films 12A and 12B are disposed in opposition to each other with a predetermined interval (for example, 6μ) therebetween filled with a liquid crystal 11. Transparent pixel electrodes 13 for forming picture elements of the liquid crystal shutter array 10 with a predetermined arrangement are embedded in one orientation film 12B at predetermined intervals. As shown in FIG. 1, photomasks 17 for intercepting the light are embedded in the other orientation film 12A at portions not corresponding to or not in alignment with the pixel electrodes 13, and a common electrode 14 is disposed on the outside of the photomasks 17. Further, a transparent substrate 15A made of glass or the like is disposed on the outside of the common electrode 14, a transparent substrate 15B is disposed on the outside of the orientation film 12B, and polarization plates 16A and 16B are further stacked on the respective outside of those transparent substrates 15A and 15B.

In FIG. 1, generally, the parallel light beam 1 is not a completely parallel beam, and therefore an example in which the incident angle is exceedingly enlarged is illustrated for the sake of explanation.

In shutter-controlling the parallel light beam 1 with the liquid crystal shutter array 10 to thereby record a picture on the photosensitive material 30, because the so-called parallel light beam 1 is not completely parallel, the degree of diffusion of the light may become so large that sufficient resolution cannot be obtained unless the light emerging from the liquid crystal shutter array 10 is converted by a focusing element such as the Selfoc lens array 20 provided between the liquid crystal shutter array 10 and the photosensitive material 30. However, the use of such a lens array is disadvantageous in that the optical system is large in size and results in a reduced efficiency of utilization of light.

SUMMARY OF THE INVENTION

The present invention has been attained in the foregoing circumstances, and an object of the present invention is to provide a liquid crystal shutter array in which focusing ability is provided in a liquid crystal shutter array itself to thereby make it possible to directly record a picture without using any other optical system.

Achieving the above and other objects, the present invention provides a liquid crystal shutter array comprising pixel electrodes, a common electrode disposed in opposition to the pixel electrodes with a gap therebetween filled with a liquid crystal, a pair of transparent substrates for supporting the pixel electrodes and the common electrode by sandwiching the pixel electrodes and the common electrode therebetween, polarization plates stacked on the respective outside of the transparent substrates, and photomasks embedded in one of the polarization plates disposed at the light output side of the liquid crystal, the polarization plate having the embedded photomasks also having opening portions such that the opening portions correspond correspondingly to a respective pixel electrodes. In the liquid crystal shutter array, there are provided microlenses in at least one of the transparent substrates at portions corresponding to the pixel electrodes so as to focus the light incident on the pixel electrodes onto photosensitive material, wherein a refractive index of light of each of the microlenses is set in a manner so that an incident angle $\theta$ of light incident on the liquid crystal through the microlenses satisfies the following expression:

$$\theta \leq \tan^{-1}\left(\frac{P-a}{d}\right)$$

where P, a, and d represent, respectively, the size of each of the photomasks, the length of a portion where each of the photomasks and corresponding ones of the pixel electrodes are superimposed on each other, and the thickness of the one transparent substrate at the light output side of the liquid crystal.

DESCRIPTION OF THE PREFERRED EMBODIMENTS

Figure 1:
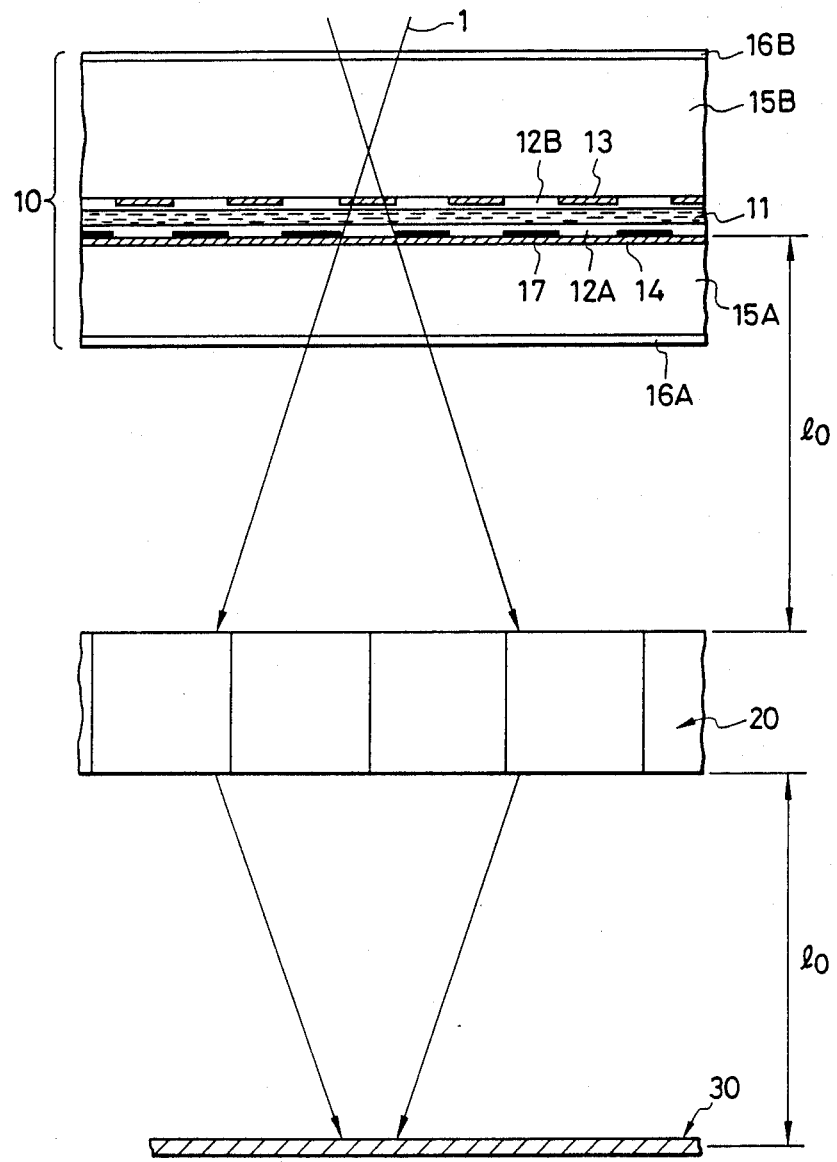
FIG. 1 is a diagram for explaining the conventional liquid crystal shutter array and the recording state when the conventional liquid crystal shutter array is used.
Figure 2:
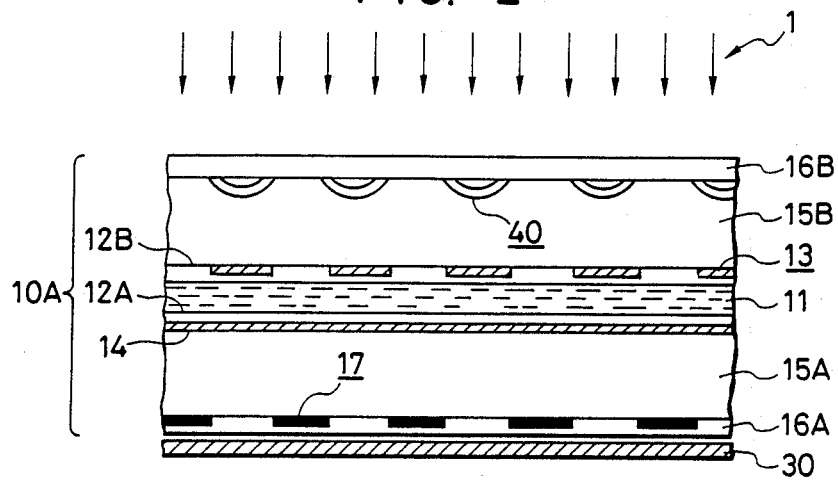
FIG. 2 is a cross section showing the structure of a preferred embodiment of a liquid crystal shutter array of the present invention.

According to the present invention, as shown in FIG. 2, microlenses 40 are provided in a transparent substrate 15B at portions where the transparent substrate 15B is in contact with a polarization plate 16B and at positions corresponding to pixel electrodes 13. Thus, the microlenses 40 are provided in the transparent substrate 15B at positions corresponding to the respective picture elements to thereby provide focusing ability to the liquid crystal shutter array 10A itself. Therefore, the microlenses 40 are made to be equivalent in focal length to each other with respect to the respective picture elements to thereby make it possible to directly focus the image on the photosensitive material 30 by shutter-controlling the parallel light beam 1. As a result, unlike the conventional arrangement, it is possible to record a picture without using any Selfoc lens array or the like having a separate focusing ability.

FIGS. 3 through 6 are diagrams for explaining the microlens 40 and a method for producing the microlens 40.

Figure 3:
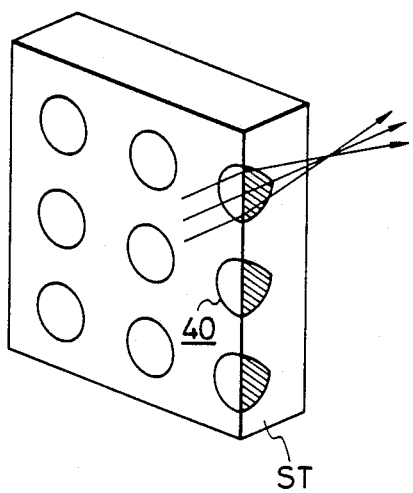
FIGS. 3 and 4 are diagrams provided for explaining microlenses used in the invention and a method for producing such microlenses.
Figure 4:
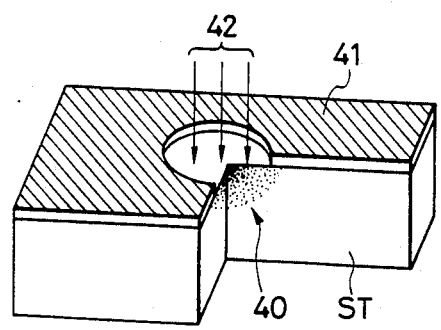

A microlens 40 of the flat plate type as shown in FIG. 3 can be produced utilizing a planar technique wherein a substrate ST which has been masked with a mask 41 as shown in FIG. 4 is made to contact over its entire surface with a dopant 42 having a high refractive index to thereby selectively diffuse the dopant 42 in accordance with the pattern of the mask 41 so as to locally provide the desired lens effect. By application of this technique to lens production, the microlenses 40 can be collectively two-dimensionally produced as shown in FIG. 3. Specifically, the dopant 42 for increasing the refractive index of the substrate ST is diffused from windows of the mask 41. Practically, implantation of the dopant 42 is accelerated by an electric field utilizing the fact that the dopant 42 is composed of ions. The concentration of the thus-implanted dopant 42 is a maximum at the surface of the substrate ST, that is, at the center of the window of the mask 41, and gradually decreases in the direction of depth of the substrate ST and in the radial direction of the window of the mask 41. The increase of the refractive index of light is proportional to the concentration of the dopant 42, and therefore the refractive index of the microlens decreases in the direction of depth and in the radial direction. As a result, the incident light beam is bent toward the center of the window of the mask 41 in the surface of the substrate ST. Therefore, a lens having smaller aberration can be produced by a suitable distribution of refractive indices of light.

To produce a linear or matrix type array of microlenses using a planar technique, it is possible to employ a plastic diffusion polymerization method, an ion exchange diffusion method, an electric-field ion implantation method, or the like, and a technique such as lithography, etching, or the like, widely used in electronics, can be applied in combination with the abovementioned techniques. The material of the microlens 40 has no specific limitation, and should only be selected in accordance with the field of application of the liquid crystal shutter array. For example, it is possible to use glass quartz, a plastic material, a crystal including a semiconductor, etc.

Next, referring to FIGS. 5 and 6, a specific method of producing the microlenses will be described.

Figure 5:
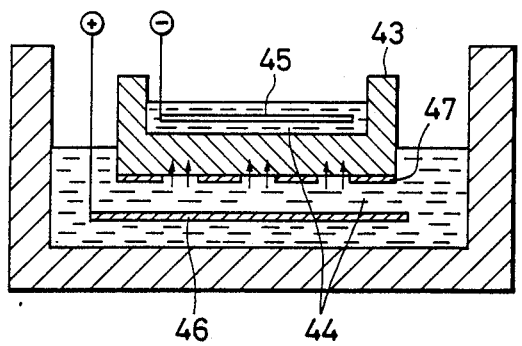
FIG. 5 is a diagram for explaining the inventive microlens producing method.

FIG. 5 illustrates the electric-field implantation method. In the glass 43 to be used as a substrate, valence one or two metal ions exist as modification oxide in a net structure of amorphous $Si_2O_2$, each of those metal ions having an electronic polarizability peculiar to the ion so as to contribute to the refractive index of the glass 43. When the glass 43 is heated, the valence one ions move in the net structure because the diffusion coefficient and mobility thereof are considerably large.

The desired distribution of refractive indices to form the microlenses in the glass 43 can be attained by replacing the valence one ions contained in the glass 43 in advance by ions of different electronic polarizability by utilizing the foregoing characteristics.

The microlenses are formed by forming distributed refractive index regions in the glass substrate 43 by the selective electric-field implantation method. That is, the glass substrate 43 masked with the mask 47 is made to contact with fused salt 44 at the opposite sides of the glass substrate 43 so as to implant metal ions contained in the fused salt 44 and having large electronic polarizability and making a large contribution to the refractive index of the glass 43 through the windows of the mask 47. The implanted ions are diffused into the glass 43 substantially along electric lines of force, while on the other hand the ions substituted by the metal ions flow into the fused salt at the cathode 45 side out of the surface of the glass 43 opposite to the surface from which the metal ions are implanted.

Figure 6:
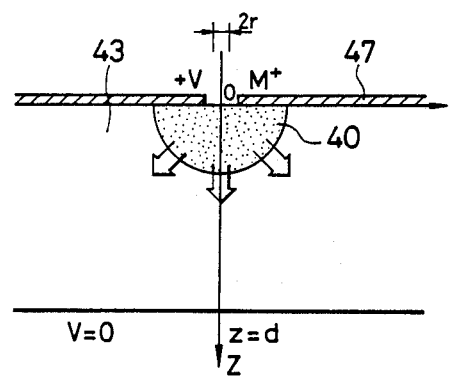
FIG. 6 is a diagram used for explaining the microlens forming process.

With respect to such a selective electric-field implantation process, it is possible to consider a model such as shown in FIG. 6. A cylindrical coordinate system is indicated in which the center of the mask 47 on the surface of the substrate 43 is defined as the origin O, the radial direction of the mask 47 is defined as the r direction, and the direction of depth of the substrate 43 is defined as the z direction. The radius of the mask 47 and the thickness of the substrate 43 are represented by r and d respectively. A voltage $V_o$ is applied to each of the opening portions of the mask 47 while the substrate 43 is held at $V=0$ at the cathode 45 side. The metal ions implanted through the windows of the mask 47 flow into the glass 43 due to drift induced by the electric field and due to diffusion caused by the concentration gradient, so that the desired distribution of refractive indices forming the microlenses 40 can be obtained.

The foregoing example relates to the case where the incident light beam 1 is focused by the microlenses 40 on the photosensitive material 30. However, it is difficult to produce a large number of microlenses 40 which have equivalent focal lengths to each other. Also, because the microlenses 40 have only a shallow depth of focus, there is a difficulty in that it is necessary to position the recording portion of the photosensitive material 30 very accurately relative to the liquid crystal shutter array 10A. Therefore, if recording can be directly performed with respect to the photosensitive material 30 in a state where the photosensitive material 30 is in close contact with the liquid crystal shutter array 10A, it is not necessary to consider the accuracy in positioning or the depth of the focal point. Further, if the diffusion of light by each of the microlenses 40 can be limited so as to produce no influence on the adjacent picture element, it is not necessary to focus the light at all.

Figure 7:
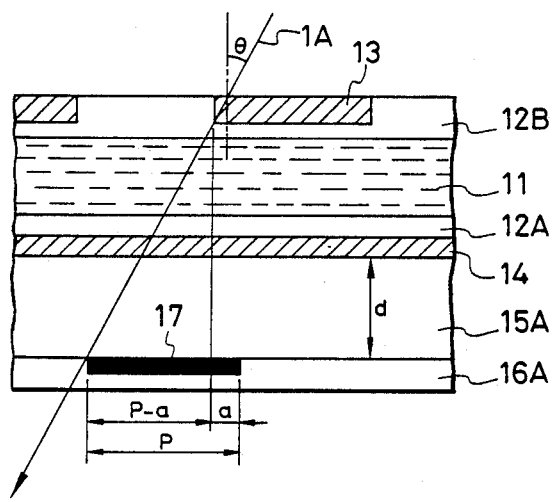
FIG. 7 is a diagram for explaining the principle of the present invention.

According to the present invention, therefore, the refractive indices of the microlenses 40 are set so that all the rays 1A of the incident light beam 1 having a certain degree of diffusion (variations in incident angles of light rays) are incident on the liquid crystal 11 with incident angles $\theta$ within a predetermined range, as illustrated in FIG. 7. In this case, with the size of the photomask 17, the length of a portion where the photomask 17 and the corresponding pixel electrode 13 overlap, and the thickness of the transparent substrate 15A represented by p, a, and d respectively, and assuming that the thickness of the liquid crystal 11 is negligible relative to the thickness d, it is sufficient that the following expression (1) be satisfied:

$$\tan \theta \leq \frac{p-a}{d} \qquad (1)$$

That is, the following expression (2) can be established.

$$\theta \leq \tan^{-1}\left(\frac{P-a}{d}\right) \quad (2)$$

Thus, as shown in FIG. 7, the refractive indexes of light of the microlenses 40 are established so that the incident angles θ of all the light rays fall within a predetermined range to cause all the light rays which pass through the microlenses 40 to be transmitted through the respective pixel electrodes 13 while preventing all light rays for one picture element from leaking to adjacent picture elements so that a picture can be recorded with high accuracy.

Further, the refractive index of the microlens 40 can be set to a desired value by adjusting the implanted amount of the above-mentioned metal ions.

Although the foregoing embodiment has illustrated the case where the microlenses 40 are formed in the transparent substrate 15B at the light incident side of the liquid crystal 11 at the portion in which the transparent substrate 15B is in contact with the polarization plate 16B, the arrangement may be modified such that the microlenses 40 are formed in the transparent substrate 15B at the portion where the transparent substrate 15B contacts the pixel electrodes 13, or at an intermediate portion in which the transparent substrate 15B is not in contact with the pixel electrodes 13 and the polarization plate 16B. Furthermore, the microlenses 40 may be formed in the transparent substrate 15A at the light output side of the liquid crystal 11 at the portion where the substrate 15A contacts with the common electrode 14, or at an intermediate portion in which the transparent substrate 15A is not in contact with the common electrode 14 and the polarization plate 16A.

As described above, in the liquid crystal shutter array according to the present invention, the light beam incident on the liquid crystal shutter array is not required to be strictly parallel, and close exposure on a photosensitive material can be made possible, so that no additional optical system is necessary. Consequently, the liquid crystal shutter array can be made small in size and recording can be performed with high accuracy.

What is claimed is:

1. A liquid crystal shutter array comprising:
a matrix of pixel electrodes, a common electrode disposed in opposition to said pixel electrodes with a gap therebetween filled with a liquid crystal, a pair of transparent substrates for supporting said pixel electrodes and said common electrode by sandwiching said pixel electrodes and said common electrode therebetween, polarization plates stacked on the respective outside of said transparent substrates, photomasks embedded in one of said polarization plates disposed at the light output side of said liquid crystal, said one of the polarization plates having opening portions between adjacent embedded photomasks, the opening portions corresponding to pixel electrodes, microlenses formed in at least one of said transparent substrates such that said microlenses correspond to said pixel electrodes, a refractive index of light of each of said microlenses being set in a manner so that an incident angle θ of light incident on said liquid crystal through said microlenses satisfies:

$$\theta \leq \tan^{-1}\left(\frac{P-a}{d}\right)$$

where P, a, and d respectively represent a length of each of said photomasks, a length of a portion where each of said photomasks and corresponding ones of said pixel electrodes overlap each other, and a thickness of said one transparent substrate at the light output side of said liquid crystal.

2. The liquid crystal shutter array of claim 1, wherein said microlenses are formed by doped regions.

3. The liquid crystal shutter array of claim 1, wherein said doped regions are formed by doping with metal ions.

4. The liquid crystal shutter array of claim 1, wherein said microlenses are formed in said one of said transparent substrates at a light incident side of said liquid crystal at a portion in which said one of said transparent substrates is in contact with said pixel electrode.

5. The liquid crystal shutter array of claim 1, wherein said microlenses are formed in said one of said transparent substrates at a light incident side of said liquid crystal at a portion in which said one of said transparent substrates is in contact with said one of said polarization plates.

6. The liquid crystal shutter array of claim 1, wherein said microlenses are formed in said one of said transparent substrates at a light output side of said liquid crystal at a portion in which said one of said transparent substrates is in contact with said common electrode.

7. The liquid crystal shutter arrays of claim 1, wherein said microlenses are formed in said one of said transparent substrates at an intermediate portion in which said one of said transparent substrates is not in contact with said common electrode, said one of said polarization plates, or said pixel electrodes.

* * * * *